United States Patent Office 2,795,641
Patented June 11, 1957

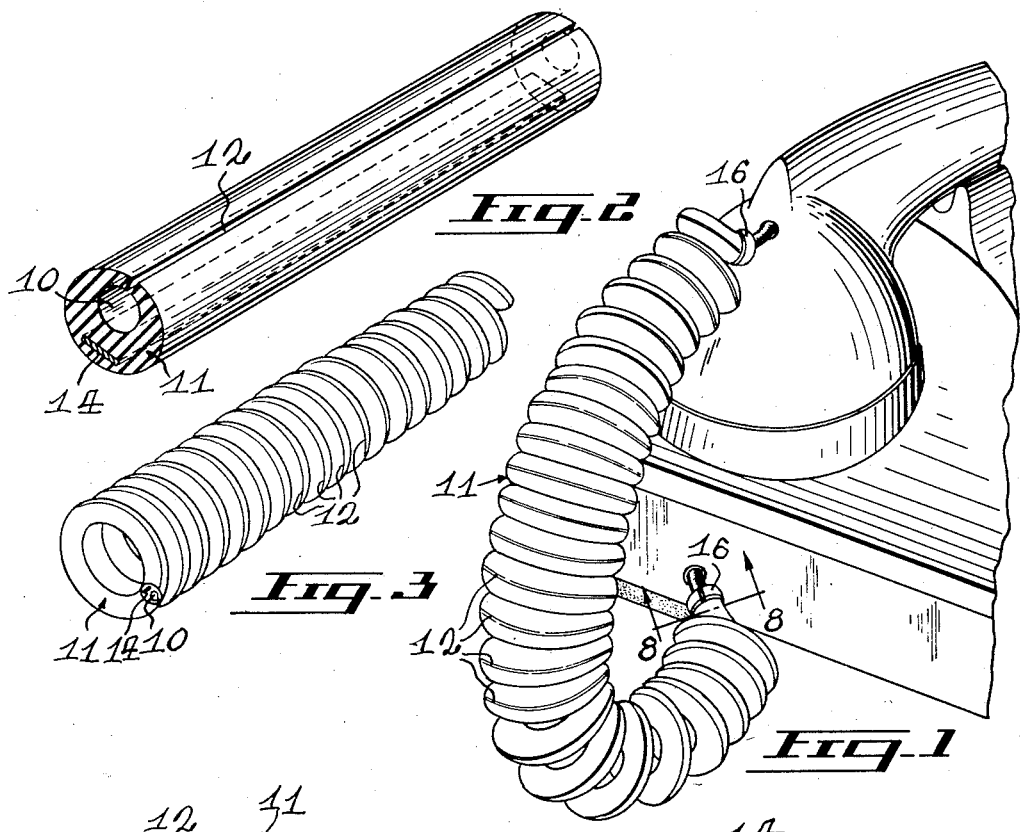

2,795,641

CORD SUPPORTING COIL

Ross Fredrick Rowell, Montreal, Quebec, Canada

Application December 3, 1953, Serial No. 395,974

4 Claims. (Cl. 174—135)

The present invention relates to devices for preventing electrical cords from becoming twisted.

More specifically, the present invention relates to the resilient coil type of attachment, by means of which the cord from an electrical appliance can be coiled and prevented from twisting or becoming entangled.

While there are many and varied types of devices for this purpose at present available, in general these are constructed so that difficulty is encountered in initially inserting the appliance cord and, further, due to the composition of the material from which these devices are made they tend to lose their resilient properties and, therefore, are unable to serve the purpose for which they were intended.

The present invention recognizes these problems and aims to provide a coil-type resilient flex for appliance cords which is designed in such a manner that an appliance cord can be easily and quickly inserted. Further, the form of construction of the basic element from which the present resilient coil is made is such that it combines the best features of the prior art devices of this nature in such a manner so as to prevent loss of resiliency while affording the maximum in flexibility.

Accordingly, the invention is a resilient coil-type flex for appliance cords which comprises essentially of a length of formed resilient material with a flexible metallic insert molded therein. The combined plastic and metal element is coiled to provide the resilient spiral coil form desired.

More specifically, the preferred material employed for the main body is of a flexible or rubber-like consistency, for example, polyethylene or the like, which is shaped so as to be preferably of cylindrical form, with an offset, internal opening or passage extending the length of the element so as to accommodate the appliance cord. The element is slotted lengthwise on one face directly into the cord-accommodating opening so that by flexing of the material the cord can be inserted through the slot into the opening. In order to add to the necessary resilient action of the coil and to maintain the plastic element in the desired spiral form, a thin strip of flexible metal is molded into the elongated resilient element in substantial alignment with, and in the same relative position as, the cord-accommodating opening, but on the opposite side of the element. This combined plastic and metal element is then wound into a spiral coil with the cord receiving slot outermost. The flexible metal strip when once formed in the spiral coil will maintain this formation and also keep the plastic portion of the element in the spiral form.

In use, the cord of the appliance is inserted in the coil by opening the slot leading into the cord-accommodating opening and winding the cord in until the entire cord, or sufficient of its length to give the necessary resilient action, is housed completely within the spiral coil. End caps, of similar combined plastic and metal materials, are then slipped over the wire ends and onto the outer ends of the resilient coil so as to maintain the end portions of the cord-accommodating slot closed preventing the cord from being pulled back out of the resilient coil when in use.

Having thus generally described the nature of the invention, particular reference will be made to the accompanying drawings wherein there is shown by way of illustration a preferred embodiment of a flexible coil-type flex as it would appear when embodied in conjunction with a cord from a telephone, and in which:

Figure 1 is a diagrammatic view in perspective elevation of a portion of a telephone hand set showing a resilient spiral coil as it would appear in combination with the cord of the telephone.

Figure 2 is a diagrammatic view in perspective of a length of combined plastic and metal strip from which the resilient coil is made in accordance with the invention.

Figure 3 is a diagrammatic view in perspective elevation of a section of a cylindrical element shown in Figure 1 as it would appear when formed into a spiral coil.

Figure 4 is a side view of a spiral coil formed in accordance with the invention with a portion of the plastic removed to illustrate the formation of the internal metal strip as it would appear when the combined material is formed into the resilient coil.

Figure 5 is a diagrammatic view showing by way of illustration the appearance of the coil when extended in operation.

Figure 6 is a cross sectional view of the cylindrical element shown in Figure 2 as it would appear with the slotted portion extended for the purpose of receiving a telephone cord.

Figure 7 is a diagrammatic view of the end portion of a spiral coil formed in accordance with the invention with the coil material and the combined cord shown in dotted lines with an end cap shown in section to illustrate the method of locking the cord accommodating slot at the ends of the coil.

Figure 8 is a cross sectional view of the portion of the spiral coil shown in Figure 8 to illustrate in more detail the relative position of the cord accommodating opening the resilient metal strip and the end retaining ring or cap.

With particular reference to Figures 1 and 7 of the drawings the basic member from which a resilient spiral coil is formed according to the invention comprises of a length of resilient material, of a rubberlike form, for example, polyethylene or the like, which is shaped, in the present example, in a cylindrical form 11 so as to have an offset internal boring or opening 10 extending the length of the formed material. The cylindrical member 11 is slotted as indicated at 12 into the boring 10 so as to provide a means of inserting an appliance cord, as shown in Figure 6. A thin strip of flexible sheet metal 14 is moulded into the resilient member 11 so as to extend longitudinally within the member and provide a means of retaining the coil shape once it has been formed.

The length of combined cylindrical element 11 and 14 so prepared is then formed into a spiral coil as shown in Figure 4, so that the internal strip 14 adopts the shape of a resilient coil spring as shown in Figure 5. The cord of the appliance, in the illustration shown a telephone cord, is then inserted through the slot 12 into the internal opening 10 so that the cord follows the contours of the spiral coil.

Suitable end retaining caps 16 are then threaded over the wire by means of a slot 18 so that they surround the terminal ends of the cylindrical member 11 and by rotation, as shown in Figure 8, the slot 18 is turned to the side of the member 11 opposite the slot 12 so as to lock the cord in the opening 10. The caps 16 are formed of similar material to the cylindrical member 11 from which the coil is made, that is, moulded from suitable resilient material, for example polyethylene or the like, with a reinforcing annular ring 19 moulded therein. The ring 19 is of flexible sheet metal strip similar to that used for the strip 14.

As will be appreciated, with this arrangement the appliance cord, for example a telephone cord as shown in Figure 1, is wholly encased within the cylindrical member 11 and the spiral coiling of the element allows the coil and the cord to be extended as required while eliminating any possibility of the cord becoming twisted or tangled.

It will be understood that while the element 11 shown is of a cylindrical form in cross section, other forms or shapes could be made without departing from the scope of the invention. Also, while the preferred material employed for the flexible metal strip is a resilient type flat metal band, other reinforcing metal members could be utilized for example spring wire or the like.

I claim:

1. A resilient appliance cord supporting coil adapted for attachment to the usual current conducting cord of an electrical appliance comprising an elongated member of resilient material having an internal cord accommodating recess along the length thereof and a co-extensive slot leading from the exterior of said member into said opening, a flexible metal strip embedded in said resilient member so as to extend the length thereof, said combined resilient member and flexible strip being subsequently formed into a elongated spiral coil with said slot disposed on the outer periphery whereby an appliance cord can be inserted therein.

2. A resilient supporting coil as claimed in claim 1, wherein cord retaining members are provided at each end of said flexible coil, said cord retaining members each comprising an annular cap of resilient material having an annular strip of flexible metal embedded therein, said annular cap being split to allow for the passage of said appliance cord.

3. A resilient appliance supporting coil as claimed in claim 1 wherein said flexible strip is flat and resilient.

4. A resilient appliance supporting coil as claimed in claim 1 wherein said elongated member is circular in cross section and said cord accommodating recess is offset from the axis of said section.

References Cited in the file of this patent

UNITED STATES PATENTS

| | | |
|---|---|---|
| 912,778 | Banes | Feb. 16, 1909 |
| 1,435,311 | Knight | Nov. 14, 1922 |
| 1,937,981 | Rosenthal | Dec. 5, 1933 |